Sept. 20, 1932.  D. C. SCOTT  1,878,191
TESTING MACHINE
Filed Feb. 8, 1927
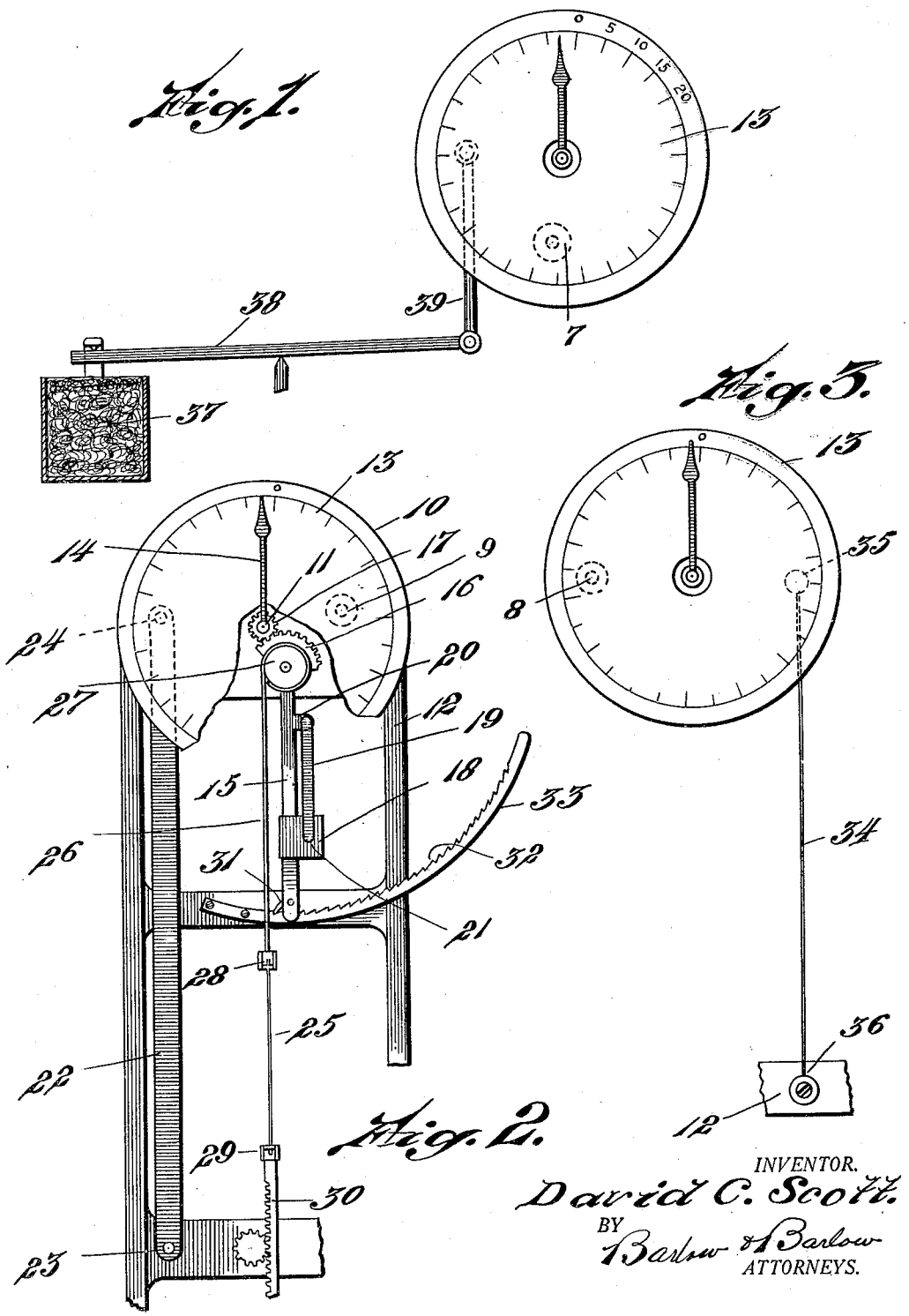
INVENTOR.
David C. Scott.
BY Barlow & Barlow
ATTORNEYS.

Patented Sept. 20, 1932

1,878,191

UNITED STATES PATENT OFFICE

DAVID C. SCOTT, OF PROVIDENCE, RHODE ISLAND, ASSIGNOR TO HENRY L. SCOTT COMPANY, OF PROVIDENCE, RHODE ISLAND, A CORPORATION OF RHODE ISLAND

TESTING MACHINE

Application filed February 8, 1927. Serial No. 166,691.

This invention relates to improvements in tensile strength testing machines; and has for its object to provide in such a machine means for automatically adjusting the mechanism thereof to affect the reading of the recording or indicating dial or member so as to compensate for the gain or loss in strength of the specimen being tested due to its moisture content at the time of testing as computed from an established standard.

A further object of the invention is to mount a hydroscopic element in the testing machine in such a way as to act upon and automatically adjust the indicating or recording unit in the machine, this adjusting member in the machine being acted upon by the same degree of moisture as the specimen being tested, to counteract in the reading the effect of the moisture in the specimen, the effect of the moisture on the specimen being to increase or diminish its strength while that on the adjusting member is to change its dimension which change is arranged to compensate in the reading of the dial of the machine for the change from an adapted standard in strength in the specimen being tested.

With these and other objects in view, the invention consists of certain novel features of construction, as will be more fully described, and particularly pointed out in the appended claims.

In the accompanying drawing:

Figure 1 is a diagrammatic view illustrating the dial as connected to be adjusted by a change in the weight of hydroscopic material through a weighing mechanism.

Figure 2 is a view showing a portion of the mechanism of my improved tensile strength testing machine in which a hydroscopic bar is arranged to automatically affect the setting of the dial by a change in its dimension due to change in moisture conditions to which it is subjected at the time of the testing.

Figure 3 is a view similar to Figure 2 illustrating a hydroscopic element connected to the indicating dial, the element being preferably of the same nature as that of the specimen being tested.

It is a well known fact that cotton is hydroscopic to a marked degree, gathering to itself automatically a large percentage of its dryweight in the form of moisture. The effect of this "regain" upon its tensile strength is very pronounced. Heavy fabrics of cotton, such as tires, hose, and belting ducks, are found to gain approximately 7% of their dry strength for each added per cent of moisture. Lighter cotton fabrics will gain a lesser percentage of strength for each added percent of moisture. From the above, it will be seen that if fabrics are tested without regard to moisture conditions or content at the time of testing, the results are apt to vary so widely that but little real knowledge of the strength or character of the fabrics will be gained.

Various methods may be employed for testing textiles; one being when the textile is in a so called "bonedry" or perfectly dry condition; a second, under standard atmospheric condition at a known regain over a bonedry condition; and a third, under prevailing atmospheric conditions with the results corrected for the actual moisture present in the specimen at the time of the test. For practical purposes this third method of testing appears to be the best and to accomplish this in a simple and practical way, I have produced a tensile strength testing machine which is constructed to permit of such adjustment, whether by adjustment of its weight or tension resisting element, or by an adjustment of its dial or pounds pull indicating mechanism, or in some cases by adjustment of both the weight and the dial, to affect and correct the reading of the machine relative to the adopted standard so as to compensate for the gain or loss in strength of the specimen being tested due to the amount of moisture contained in the specimen at the time of testing.

For instance, the machine employed may be normally set to test certain cotton fabrics under a certain adopted standard of moisture content, say for instance 6½% above the bonedry condition and when employed to test a specimen whose moisture content is known to vary from that standard the weight on the machine may be adjusted in the present case automatically to compensate for the change in strength of the specimen due to the difference in moisture content so as to cause its dial to read in terms of the adopted standard; that is, if the specimen contained more moisture than the adopted standard its strength would be increased a definite amount over said standard according to its character, and the weight would be lowered on its arm to the indicated point on the scale exerting a greater pull on the specimen than that indicated on the dial and if the specimen contained less than that standard amount of moisture, then the weight would be raised on the arm the required amount to correspondingly reduce the resistance and so again correct the dial reading to indicate strength in terms of the adopted standard; and the following is a detailed description of the present embodiment of my invention and showing a number of different arrangements of hydroscopic elements so arranged on my improved machine so as to accomplish these advantageous results:

In the machine herein illustrated the dial 10 may be rotatably mounted upon the central pivot 11 supported on the frame 12, the dial being graduated on its face as at 13 to indicate pounds pull or other unit of measure of the breaking strength of the specimen being tested, and over this dial face is arranged to swing an indicating hand 14, the same being mounted on the central pivot 11, and this hand is caused to move over this dial by the swinging movement of the weight arm 15 through the segment 16 and pinion 17. On this weight arm is slidably mounted a tension-resisting weight 18 and the position of this weight on this arm may be varied; that is, raised or lowered by the lengthening or shortening of the hydroscopic member 19, one end of which is fixed to the base 20 on the arm, while its opposite end 21 is connected to the weight. This hydroscopic member may be formed of any suitable material such as wood, cotton or other hydroscopic material, the length of which is affected by the action of moisture upon it. In this particular case a bar of wood is shown which when acted upon by moisture will elongate and push the weight further downwardly on the arm to automatically exert a greater resistance on the specimen being tested and so compensate in the reading on the dial for the greater strength of this specimen, particularly when this specimen is made of cotton. In other instances a bar of wood 22 or other suitable hydroscopic material may be connected at one end at 23 to the frame of the machine, and at its opposite end 24 to the dial 10 so that as its length is affected, due to changing moisture conditions, this bar will cause the dial to rotate on its center relative to the indicating pointer 14 to compensate for the gain or loss in strength on the specimen being tested. In this case I have mounted a balance weight 9 to take up lost motion in the joints. The specimen 25 may be connected to the machine in any suitable way, but I have herein shown the same as connected to the weight arm through the flexible member 26 which is fixed at one end to the drum 27, which drum is secured to the weight arm 15, the lower end of this flexible member being provided with a clamp 28 for gripping the upper end of the specimen 25, while a clamp 29 connects the opposite end of the specimen to the tension member 30.

As tension is applied to the specimen the weight arm 15 swings outwardly and when the specimen breaks, the pawl 31 carried by this arm engages the teeth 32 on the rack 33 to prevent the arm from immediately returning when the specimen ruptures, thereby permitting a careful reading of the dial to be had.

For instance, it will be noted that when the cotton specimen is being tested in a room or locality containing a high degree of moisture the specimen will absorb the moisture and its strength will therefore be increased over an adopted standard of moisture. In order to compensate automatically for this increase in strength I have provided a hydroscopic bar 22 one end of which is connected to the frame and its opposite end to the dial and as the high degree of moisture acts upon this bar it is caused to elongate and so naturally rotates the dial so that the reading of the pointer will be less than zero, the difference between the position of the pointer and zero indicating the amount of strength in pounds that the specimen had increased beyond an adopted standard of moisture and the opposite effect is produced when the moisture at the time of the test is below the adopted standard. In some instances, this bar may be employed to directly act upon the dial to compensate for the gain or loss in strength of the specimen while in other instances a hydroscopic member 19 may be connected to the weight on the arm to raise or lower the same and so automatically increase or decrease the pull relative to the adopted standard and in this way compensate for the reading of the dial while in still other instances both the dial and the weight may be utilized to jointly produce the desired reading correction by simultaneously shifting the dial and changing the pull. In other instances, as illustrated in Figure 3, thread or the like 34 of substantially the same character as the specimen being tested may be connected at one end 35 to the dial and at its opposite end 36 to the frame 12 so that the moisture in acting upon this cotton thread or other hydroscopic member will contract the same and so rotate the dial to compensate for difference in strength of the material being tested. In this case I mount a weight 8 on the dial to retain the member 34 under tension. In still other instances the hydroscopic material 37 may be supported in a receptacle on the end of a scale beam 38 and connected at its other end through the rod 39 to the dial 13 so that the moisture in the air at the time of testing will affect the weight of the hydroscopic material to adjust the reading of the dial and so compensate for the gain or loss in strength of the specimen being tested. In this case I have mounted a counterbalance weight 7 on the disc to take up the wear at the joints.

I have herein shown several means for automatically compensating for the gain or loss of strength of the specimen being tested relative to an adopted standard. I have also mentioned cotton as being one of the materials but material of any character whose strength is affected by the action of moisture may be tested by my improved machine and I have mentioned wood and cotton as being employed as compensating elements, but any suitable material may be employed for this purpose. In fact any suitable means may be employed for automatically compensating for this change in strength of the material being tested without departing from the spirit or scope of my invention.

My mechanism herein shown and described for the purpose of automatic adjustment of the reading in the tensile testing machine is extremely simple and practical and is effective in its operation as by its use or the use of other similar devices the gain or loss in the material being tested may be automatically compensated for causing the reading of the dial to indicate the strength of the material being tested relative to an adopted standard of moisture content.

My copending application of even date herewith is drawn to cover manually adjustable means for compensating for the change in strength of the material being tested.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a machine for testing the tensile strength of materials, means for exerting pull upon the material, means responsive to such pull for measuring the force thereof and including a dial and indicating hand for indicating the rupture point of said materials, a device responsive to changes in the moisture content of the atmosphere, operative connections between said device and said dial for moving said dial to correct the rupture point reading, the corrected reading as compared to the actual rupture point bearing the same ratio that a predetermined standard atmospheric moisture content bears to the actual atmospheric moisture condition at the time the test is made.

2. In a machine for testing the tensile strength of materials, means for exerting pull on the material to be tested, an indicator having relatively movable parts, one controlled by said means, for indicating the exerted pull, and means responsive to changes in atmospheric moisture content for adjusting the relation of the relatively movable parts of the indicator to compensate for variation in strength of the specimen to be tested as compared to the strength of a specimen having a standard moisture content.

3. In a machine for testing the tensile strength of materials, means for exerting pull on the material to be tested, an indicator having relatively movable parts, one controlled by said means, for indicating the exerted pull, a hygroscopic member, and means responsive to change of state of said hygroscopic member for adjusting the relation of the relatively movable parts of the indicator to compensate for divergence of the material at the time of test from a standard atmospheric moisture content.

4. In a machine for testing the tensile strength of materials, means for exerting pull on the material to be tested, an indicator having relatively movable parts, one controlled by said means, for indicating the exerted pull, and means responsive to changes in atmospheric moisture content operatively connected to one of said movable parts for controlling said part to correct the reading on said indicator.

5. In a machine for testing the tensile strength of material, means for exerting pull on the material to be tested, an indicator having relatively movable parts, one controlled by said means, for indicating the exerted pull, said pull exerting means including means for varying said pull, and said last named means including an element responsive to changes in atmospheric moisture content to compensate for variation in strength of the material being tested.

In testimony whereof I affix my signature.

DAVID C. SCOTT.